United States Patent
Abe

(10) Patent No.: US 7,865,219 B2
(45) Date of Patent: Jan. 4, 2011

(54) PORTABLE TERMINAL

(75) Inventor: Yasuhiro Abe, Yokohama (JP)

(73) Assignee: Kyocera Corporation, Takedatobadono-cho, Fushimi-ku, Kyoto-shi, Kyoto (JP)

( * ) Notice: Subject to any disclaimer, the term of this patent is extended or adjusted under 35 U.S.C. 154(b) by 711 days.

(21) Appl. No.: 10/673,890

(22) Filed: Sep. 29, 2003

(65) Prior Publication Data

US 2004/0132499 A1 Jul. 8, 2004

(30) Foreign Application Priority Data

Sep. 30, 2002 (JP) .............................. 2002-287135

(51) Int. Cl.
*H04M 1/00* (2006.01)
(52) U.S. Cl. ................. 455/575.3; 455/566; 455/575.1; 455/550.1
(58) Field of Classification Search ............. 455/575.1, 455/575.3, 575.4, 550.1, 566, 567, 90.3, 455/347
See application file for complete search history.

(56) References Cited

U.S. PATENT DOCUMENTS

| | | | | |
|---|---|---|---|---|
| 5,485,517 A * | 1/1996 | Gray | ...................... | 379/433.13 |
| 6,009,336 A * | 12/1999 | Harris et al. | ................. | 455/566 |
| 6,230,028 B1 * | 5/2001 | Shirakawa | ................... | 455/566 |
| 6,466,202 B1 * | 10/2002 | Suso et al. | ................... | 345/169 |
| 6,549,789 B1 * | 4/2003 | Kfoury | ..................... | 455/550.1 |
| 6,662,244 B1 * | 12/2003 | Takahashi | ..................... | 710/14 |
| 6,731,959 B1 * | 5/2004 | Kumagai et al. | .......... | 455/575.3 |
| 6,766,182 B2 * | 7/2004 | Janninck et al. | ........... | 455/575.3 |
| 6,850,784 B2 * | 2/2005 | SanGiovanni | ............ | 455/575.1 |
| 6,862,459 B2 * | 3/2005 | Sawada et al. | ............ | 455/550.1 |
| 6,965,413 B2 * | 11/2005 | Wada | ........................ | 348/376 |
| 6,978,127 B1 * | 12/2005 | Bulthuis et al. | .......... | 455/412.1 |

(Continued)

FOREIGN PATENT DOCUMENTS

CN 1170329 A 1/1998

(Continued)

OTHER PUBLICATIONS

Korean Notification of Submission of Argument dated Sep. 28, 2005 (w/translation).

(Continued)

*Primary Examiner*—Ajit Patel
*Assistant Examiner*—Khai M Nguyen
(74) *Attorney, Agent, or Firm*—Schulte Roth & Zabel LLP; John C. Garces

(57) ABSTRACT

A portable terminal has a first housing having at least a display unit, a second housing having at least a main input unit, and connected openably and closably to the first housing, and an auxiliary input unit arranged on a surface other than mutually facing surfaces of both of the housings in a closed state. The display unit is visible to user in a closed state and an opened state, a screen on the display unit is able to display a first selection screen which is appropriate for an operation by the auxiliary input unit when both of the housings are in a closed state, and a screen on the display unit is able to display a second selection screen which is appropriate for an operation by the main input unit when both of the housings are in an opened state.

14 Claims, 9 Drawing Sheets

U.S. PATENT DOCUMENTS

| | | | |
|---|---|---|---|
| 7,480,379 B2 * | 1/2009 | Yoshikawa | 379/433.06 |
| 2001/0044319 A1 * | 11/2001 | Kobayashi | 455/550 |
| 2002/0033798 A1 * | 3/2002 | Nakamura et al. | 345/156 |
| 2002/0058527 A1 * | 5/2002 | Kawasaki et al. | 455/550 |
| 2002/0061770 A1 * | 5/2002 | Ozaki | 455/566 |
| 2005/0107138 A1 * | 5/2005 | SanGiovanni | 455/575.1 |
| 2008/0207281 A1 * | 8/2008 | Tsuchiya et al. | 455/575.1 |

FOREIGN PATENT DOCUMENTS

| | | | |
|---|---|---|---|
| JP | 2001-298513 | * | 10/2001 |
| JP | 2001-313701 | * | 11/2001 |
| JP | 2002-033809 | * | 1/2002 |
| JP | 2002033809 | | 1/2002 |
| JP | 2002141984 | | 5/2002 |
| KR | 2002-76811 | | 5/2002 |

OTHER PUBLICATIONS

Japanese Office Action dated Mar. 27, 2007 with partial English translation.

* cited by examiner

PRIOR ART

PORTABLE TERMINAL

BACKGROUND OF THE INVENTION

1. Field of the Invention

The present invention relates to a portable terminal such as a portable telephone or PDA, and, specifically, the present invention relates to a portable terminal apparatus that is formed by a plurality of housings that are joined such that one housing can be superimposed on the other housing, and in which a display screen of a display unit provided in one of the housings is visible to the outside in both a superimposed state and in non-superimposed states, and in which output information is displayed on the display screen in any of these states, Priority is claimed to Japanese application No. 2002-287135, filed Sep. 30, 2002, which is incorporated herein by reference.

2. Description of Related Art

Conventionally, a folding portable telephone 2 such as that shown in FIG. 12 is generally known as a folding portable terminal apparatus having two foldable housings. This folding portable telephone 2 is provided with a speaker 13 and a display screen 12 such as a liquid crystal display (LCD) that displays output information on an inner surface 10 of one of the housings 4. A main input unit 16 and a microphone 15 are provided on an inner surface 14 of the other housing 6.

A cross key 18 that instructs movement in up and down directions as well as left and right directions, a ten key, and various other keys are provided on the main input unit 16 so that items to be displayed on the display screen 12 can be selected.

In this type of folding portable telephone 2, the respective functions performed by the folding portable telephone 2 are displayed on the display screen 12 as a selection screen. At this time, characters are displayed so that a user can understand what each function is, and these characters are arranged in a manner such as that shown in FIG. 8.

However, in the folding portable telephone 2 shown in FIG. 12, the drawback has existed that when the one housing 4 and the other housing 6 are folded shut the display screen 12 cannot be viewed unless the two housings are opened, and even if information is output to the display screen 12, this cannot be viewed with the housings in a folded shut state. In order to solve this type of annoying, time consuming drawback, portable telephones have been developed in which the display screen 12 faces outwards even when the portable telephone is in a folded state or in a state equivalent to a folded state.

An example of such a portable terminal apparatus is the superimposed type of portable terminal apparatus disclosed in Japanese Patent Application Laid-Open (JP-A) No. 2002-141984. This superimposed type of portable terminal apparatus is formed such that, when the two joined housings are in an open state, a display surface provided in one of the housings faces inwards with the same attitude as the folding portable telephone 2 shown in FIG. 12.

However, unlike the folding portable telephone apparatus 2, this type of conventional superimposed portable terminal apparatus is structured such that one housing can be folded and superimposed on top of the other housing while being twisted 180 degrees around a joint portion where the two housings are joined. Therefore, the two housings can be superimposed with the display surface facing outwards.

However, even though a user is able to view the display surface, when the two housings are in a superimposed state, the main input unit is covered up and hidden by the display surface housing. Therefore, it is not possible to operate the input unit. In order to solve this type of problem, as in the invention disclosed in JP-A No. 2002-33809, an auxiliary input key is provided on the surface on the side of the housing.

Because there is a limit on the surface area and width of the surface on the side of the housing, it is difficult to use a cross key or a key equivalent to a cross key as the auxiliary input key. Therefore, even if it is possible when the two housings are in a superimposed state to view the various functions provided in the portable telephone 2 via the display unit, as is shown in FIG. 8, items displayed as characters can only be displayed arranged one-dimensionally in a vertical direction on a selection screen. Moreover, the same selection screen is displayed on the display surface regardless of whether the housings are in a superimposed state or in an open state.

However, when a selection screen on which items displayed as characters are arranged one dimensionally is displayed on a display surface whose size is limited, as is the case with the portable telephone 2, if a user wishes to display a large number of items at the same time the characters shrink in size and become difficult to read. In contrast, if the characters are enlarged, the number of items that can be displayed at the same time is decreased. Therefore, when searching for a particular item it is necessary to scroll through the selection screen by operating the auxiliary input key, which is a drawback from the standpoint of operability.

Moreover, in a conventional superimposed type of portable terminal apparatus, because the aforementioned selection screen is displayed regardless of whether the housings are in a superimposed state or an open state, although it is possible to select up, down, left, and right using a cross key or the like of the main input unit in the open state. However, when selecting an item on the selection screen, because only operations in the up and down direction can be used, the drawback has existed that the functions of the main input unit cannot be satisfactorily put to use.

Therefore, it is an aim of the present invention to provide a superimposed type of portable terminal apparatus that has one selection screen for when the two housings are superimposed and another selection screen for when they are open. That is, in cases when the two housings are superimposed and the main input unit cannot be operated, the superimposed type of portable terminal apparatus displays on the display unit a selection screen that allows input to be made using an auxiliary input unit, while in cases when the two housings are opened and the main input unit can be operated, the superimposed type of portable terminal apparatus displays on the display unit a selection screen that is easy to read and that allows full use to be made of the functions of the main input unit.

BRIEF SUMMARY OF THE INVENTION

The first aspect of the present invention is a portable terminal has a first housing having at least a display unit, a second housing having at least a main input unit, and connected openably and closably to the first housing, and an auxiliary input unit arranged on a surface other than mutually facing surfaces of both of the housings in a closed state, wherein the display unit is visible to user in a closed state and an opened state, a screen on the display unit is able to display a first selection screen which is appropriate for an operation by the auxiliary input unit when both of the housings are in a closed state, and a screen on the display unit is able to display a second selection screen which is appropriate for an operation by the main input unit when both of the housings are in an opened state.

It is also possible to employ a structure in which the first selection screen arranges items one-dimensionally, and the second selection screen arranges items multi-dimensionally.

It is also possible to employ a structure in which items of the first selection screen are characters, and items of the second selection screen are icons.

It is also possible to employ a structure in which the portable terminal further has a state detecting device which detects opening and closing of both of the housings, and a control device which switches a display screen on the display unit, wherein the control device switches between the first selection screen and the second selection screen in accordance with a state detected by the state detecting device.

It is also possible to employ a structure in which items on the first selection screen are characters while items on the second selection screen are icons, and when a selection screen has been switched in accordance with an opening action or a closing action from a state in which an item on the first or second selection screen has been selected, the item remains selected in a form of a character or an icon corresponding to the first or second screen.

It is also possible to employ a structure in which the main input unit includes a key capable of being two-dimensionally operated, and the auxiliary input unit includes a lever capable of being one-dimensionally operated.

The above described portable terminal may be a personal digital assistant (PDA) or a portable telephone.

The second aspect of the present invention is a portable terminal has a first housing having at least a display unit; a second housing having at least a main input unit, and connected openably and closably to the first housing; and an auxiliary input unit arranged on a surface other than mutually facing surfaces of both of the housings in a closed state; wherein the display unit is visible to user in a closed state and an opened state, a screen on the display unit is able to display a first selection screen arranging items one-dimensionally when both of the housings are in a closed state, and a screen on the display unit is able to display a second selection screen arranging items multi-dimensionally when both of the housings are in an opened state.

It is also possible to employ a structure in which the main input unit includes a key capable of being two-dimensionally operated, and the auxiliary input unit includes a lever capable of being one-dimensionally operated, items on the first selection screen can be selected by the lever operation, and items on the second selection screen can be selected by the key operation.

The above-described portable terminal may be a PDA or a portable telephone.

According the above-aspects, it is possible for a user to select a specific item from a selection screen that is displayed on a display surface and to enter the item, because the user keeps the two housings in a closed state without having to perform an opening action. Furthermore, the display unit is able to display a first selection screen which is appropriate for an operation by the auxiliary input unit when both of the housings are in a closed state, and a second selection screen which is appropriate for an operation by the main input unit when both of said housings are in an opened state, and it is possible for the auxiliary input unit and the main input unit to make the best use of these functions.

In particular, because items on the second selection screen are icons, it is possible for a user to understand intuitively the function of each item of the portable terminal. Furthermore, because the second selection screen arranges items multi-dimensionally, the display screen having a limited size is able to display numerous items; that is, it is possible for visibility and operating action to be improved.

Furthermore, the portable terminal has a state detecting device which detects opening and closing of both of the housings and a control device which switches a display screen on the display unit, the control device switches between the first selection screen and the second selection screen in accordance with a state detected by the state detecting device. Therefore, the display unit is able to display the selection screen based on the state. In addition, when a selection screen has been switched in accordance with an opening action or a closing action from a state in which an item on the first or second selection screen has been selected, the predetermined item is selected. Therefore, there is no need to repeat operation.

DETAILED DESCRIPTION OF THE INVENTION

Figure 1:
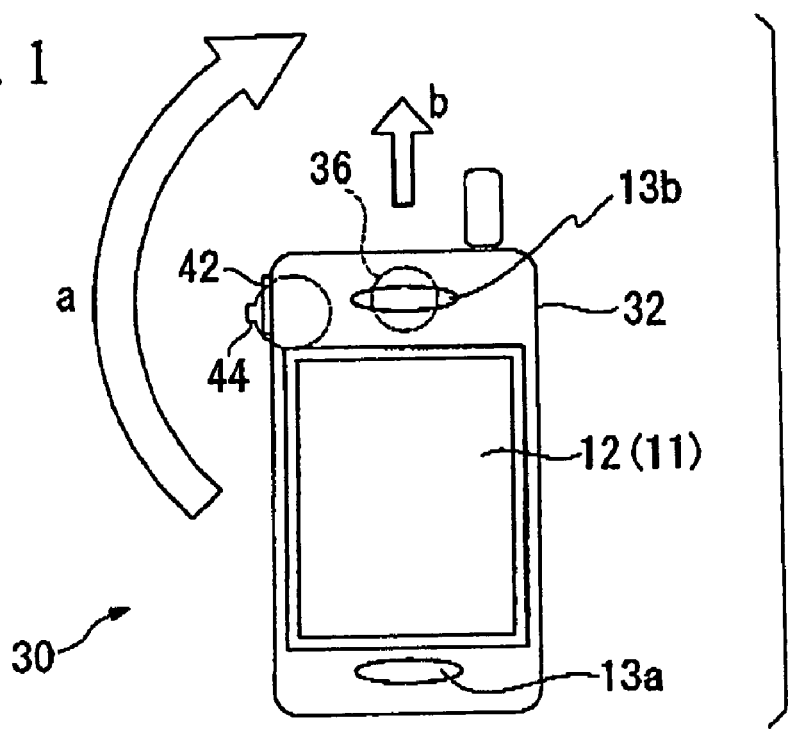
FIG. 1 is a frontal view showing a superimposed type of portable telephone according to an embodiment of the present invention.

An embodiment of the portable terminal of the present invention will now be described in detail based on the drawings.

FIGS. 1 through 11 are drawings that will be referred to in order to describe a superimposed type of portable telephone 30 according to an embodiment of a portable terminal of the present invention. The same reference numeral that are used for the conventional folding portable telephone 2 are used for the same portions of the superimposed type of portable telephone 30 shown in these drawings, and any duplicate description of any structure that is the same as in a conventional portable telephone is omitted.

Figure 2:
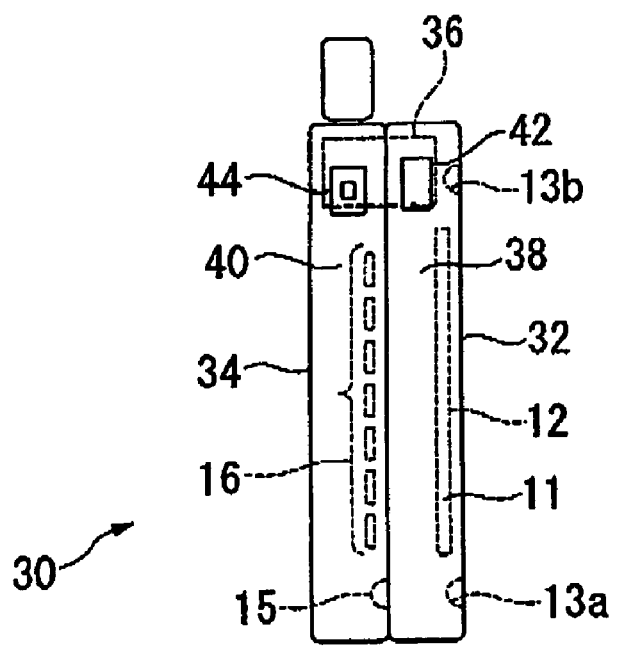
FIG. 2 is a view from the left side of the superimposed type of portable telephone shown in FIG. 1.

As is shown in FIGS. 1 and 2, the superimposed type of portable telephone 30 is formed by a first housing 32 and a second housing 34 that are joined by a shaft 36 that extends in a direction penetrating the first housing 32 and the second housing 34.

The superimposed type of portable telephone 30 is provided with a display unit 11 on the surface of the first housing 32 that is on the opposite side from the second housing 34 so that a display surface 12 is visible from the outside even when the first housing 32 and the second housing 34 are in a superimposed state. In addition, a side key 42 and a 3-directional lever 44 are provided as auxiliary input units in the side surfaces 38 and 40 respectively of the first housing 32 and the second housing 34 so that a user is able to operate the portable telephone 30.

13a and 13b are speakers provided respectively in the surface of the first housing 32 in which the display unit 11 is located, and are positioned vertically on either side of the display unit 11. 15 is a microphone provided on the surface of the second housing 34 in which the main input unit 16 is located.

Figure 3:
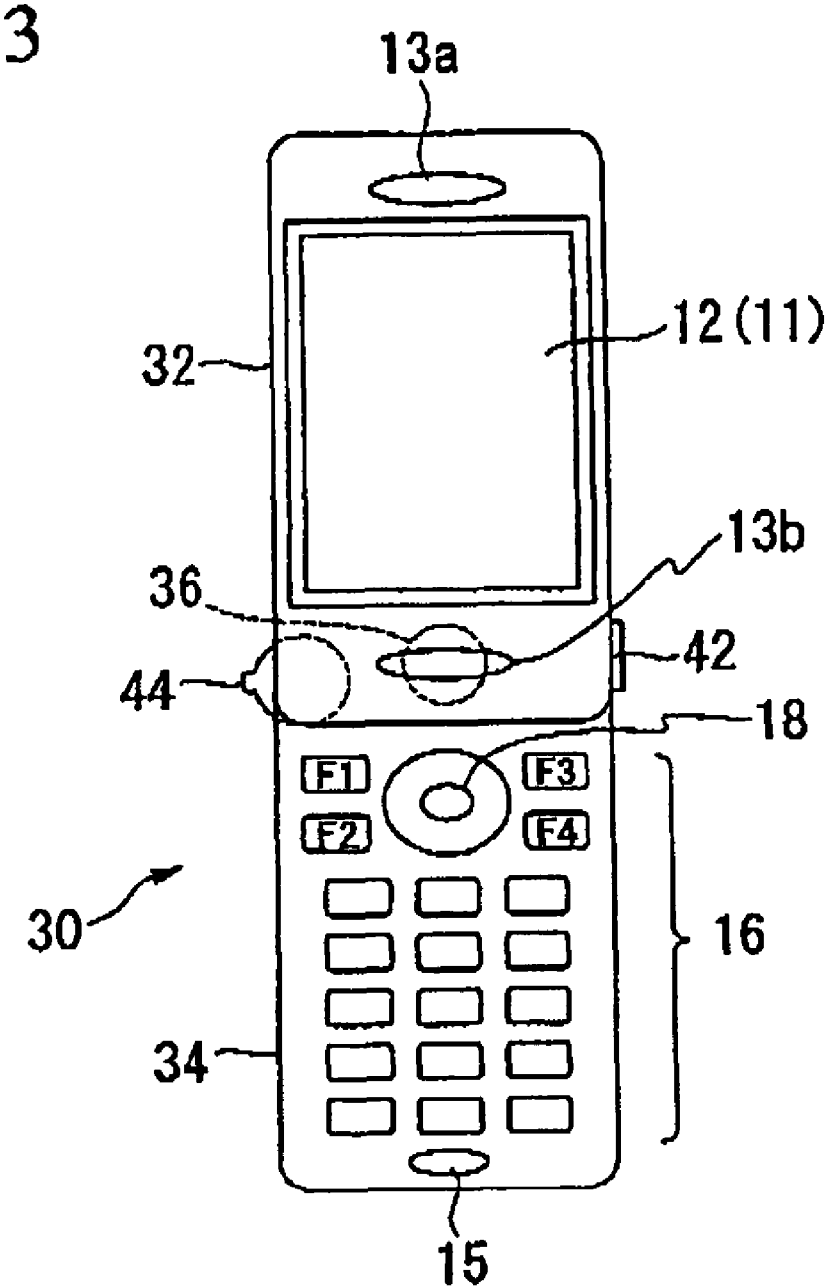
FIG. 3 is a frontal view showing the superimposed type of portable telephone shown in FIG. 1 in an open state.
Figure 4:
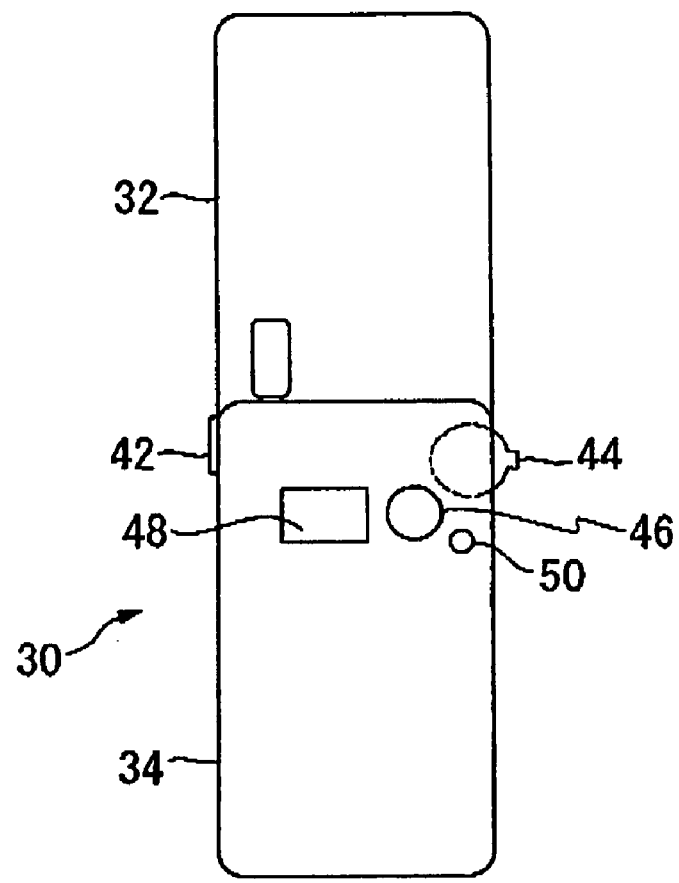
FIG. 4 is rear view showing the superimposed type of portable telephone shown in FIG. 1 in an open state.

By rotating the first housing 32 180 degrees, as is shown by the arrow a, around the shaft 36 from a state in which the first housing 32 and the second housing 34 are superimposed, the superimposed type of portable telephone 30 is placed in an open state in which the main input unit 16 provided in the second housing 34 exposure to the outside, as is shown in FIGS. 3 and 4. At this time, because the display surface 12 is rotated on the shaft 36 while it is facing in substantially the same direction as the main input unit 16, the display surface 12 is visible from the outside even when the portable telephone 30 is in an open state.

Note that the portable telephone apparatus 30 according to the present embodiment has a structure in which the first housing 32 rotates around the shaft 36, however, as a different embodiment to this, it is also possible to employ a structure in which a rail or the like is provided and the first housing 32 slides from the state shown in FIG. 1 in the direction shown by the arrow b relative to the second housing 34.

As in the invention described in JP-A NO. 2002-141984, it is also possible to employ a structure in which the first housing 32 and the second housing 34 are joined and this join portion has a structure that allows both a folding action and a twisting action to be performed.

Accordingly, even if the superimposed type of portable telephone has one of the structures described above, in the same way as the superimposed type of portable telephone 30 of the present embodiment, it is able to go from the state shown in FIGS. 1 and 2 to the state shown in FIGS. 3 and 4. Therefore, in the present invention, a state such as that shown in FIGS. 1 and 2 is called a "superimposed state" or a "closed state", while a state such as that shown in FIGS. 3 and 4 is called an "open state".

Next, the main input unit 16 as well as the side key 42 and the 3-directional lever 44 will be described. As is shown in FIG. 3, in the portable telephone 30, in a state in which the first housing 32 and the second housing 34 are open, the main input unit 16 located on the inner side of the second housing 34 is able to be operated and the cursor key 18 can also be used. In order to prevent input errors at this time the side key 42 and 3-directional lever 44 are made inoperative.

As is shown in FIG. 4, the portable telephone 30 is provided with a camera 46, a mirror 48, and a recording microphone 50 on the rear surface thereof. These can be operated both when the first housing 32 and the second housing 34 are in an open state and when they are in a superimposed state.

Figure 5:
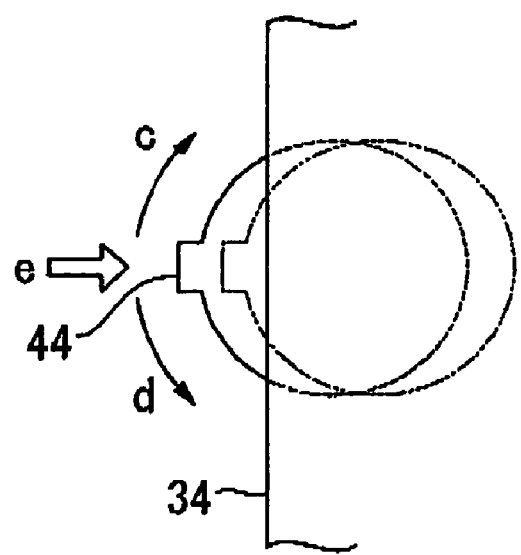
FIG. 5 is a partial enlarged view showing the 3-directional lever 44 in FIG. 1.

As is shown in FIG. 5, the 3-directional lever 44 that is used when the first housing 32 and the second housing 34 are in a superimposed state can be moved in an upward direction (indicated by the arrow c) and a downward direction (indicated by the arrow d). It is also able to be pressed in an inward direction toward the center of the portable telephone (indicated by the arrow e).

Figure 8:
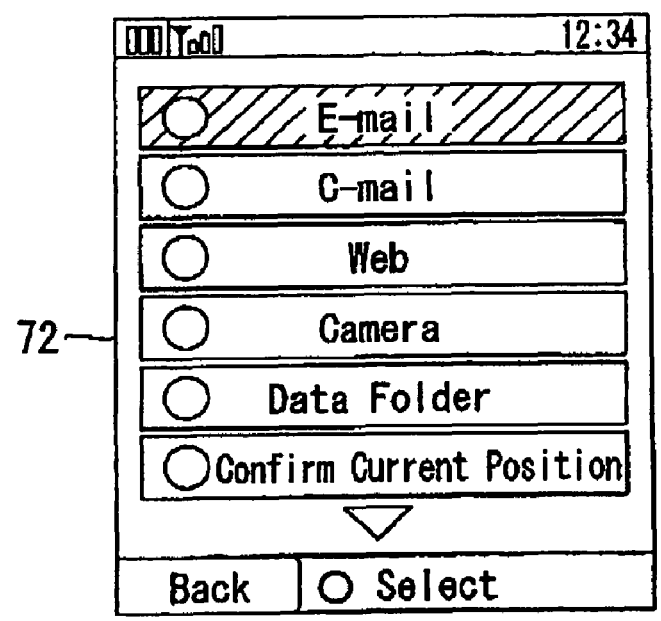
FIG. 8 is a view showing a selection screen 72 displayed on the display unit 12 in FIG. 1.

Accordingly, when items on a first selection screen 72 displayed on the display surface 12 are arranged in a vertical direction (i.e., are in a one dimensional arrangement) in a closed state, as is shown in FIG. 8, the operation of the 3-directional lever 44 can be set such that when it moves upward (shown by the arrow c) or downward (the arrow d) an item can be selected, while when it is pressed inward (the arrow e) the selected item can be entered.

Figure 6:
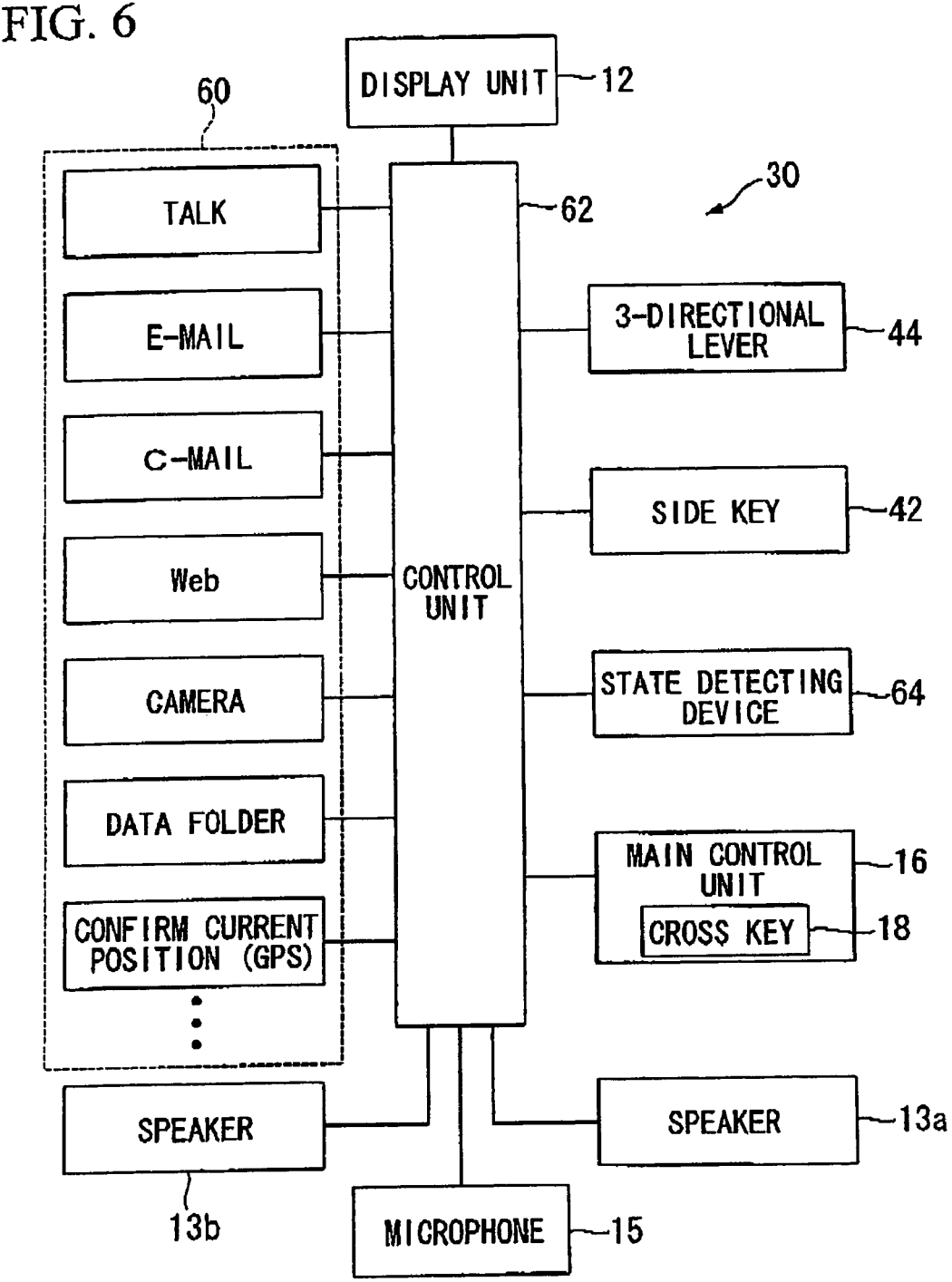
FIG. 6 is a circuit diagram of the superimposed type of portable telephone shown in FIG. 1.

FIG. 6 shows a circuit diagram of the superimposed type of portable telephone 30. Each of the various functional portions represented by the reference numeral 60 are operated under the control of the control unit 62. In this circuit, a state detecting device (i.e., state detecting unit) 64 is not shown in FIGS. 1 through 4, the state detecting device 64 detects whether the first housing 32 and the second housing 34 are in a closed state or in an open state. A connection that is closed by the rotation of the first housing 32, for example, or a mechanical switch or sensor may be provided as the state detecting device 64.

When the first housing 32 and the second housing 34 are open (i.e., are in an open state), the state detecting device 64 outputs a signal to the control unit 62 indicating that fact. The control unit 62 receives this signal and locks the side key 42 and the 3-directional lever 44 so that even if they are operated the operations thereof are invalid.

When the first housing 32 is rotated 180 degrees from an open state so that it is superimposed on the second housing 34, because the orientation of the display surface 12 is reversed vertically, the display screen is also inverted 180 degrees when a display is made.

When the first housing 32 and the second housing 34 are in a superimposed state (i.e., are in a closes state), the state detecting device 64 outputs a signal to the control unit 62 indicating that fact. The invalid operation lock on the side key 42 and the 3-directional lever 44 is then released so that these keys are made operational.

Furthermore, it is possible to operate the various functions of the portable telephone 30 not only in the open state of the first housing 32 and the second housing 34, but also when they are in a closed state. In particular, it is also possible to have a telephone conversation in the closed state.

That is, when a call is received with the portable telephone 30 in an open State, a call arrival tone sounds independently from the two speakers 13a and 13b so that the arrival tone is heard with a stereo effect. When one of the keys of the main input unit 16 is pressed, the call arrival tone ends and the speaker 13b is deactivated. At the same time, the speaker 13a functions as an answering speaker, the microphone 15 is activated and it is possible to hold a telephone conversation. If a call is received with the portable telephone 30 in a closed state, in the same way as in an open state, a call arrival tone with a stereo effect is heard from the two speakers 13a and 13b. If the 3-directional lever 44 of the auxiliary input unit is then pressed inwards, the call arrival tone ends and the speaker 13a is deactivated. At the same time, the speaker 13b functions as an answering speaker, the microphone 15 is activated and it is possible to hold a telephone conversation.

Figure 7:
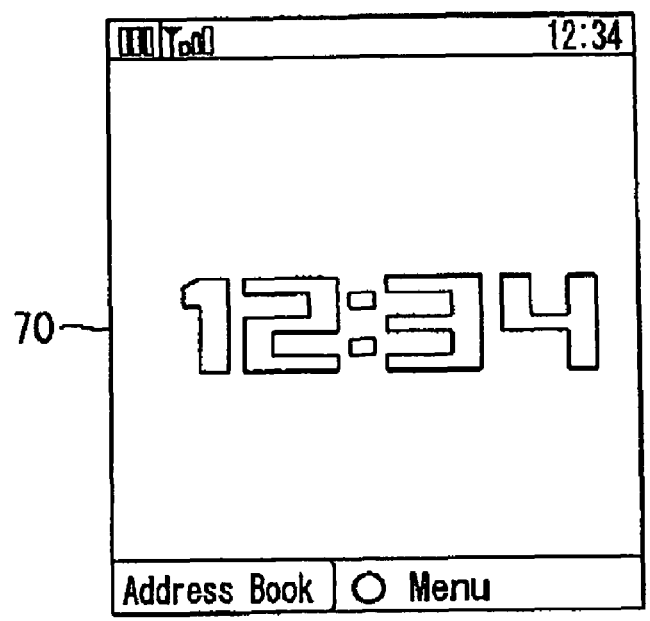
FIG. 7 is a view showing a wait screen 70 displayed on the display unit 12 in FIG. 1.
Figure 9:
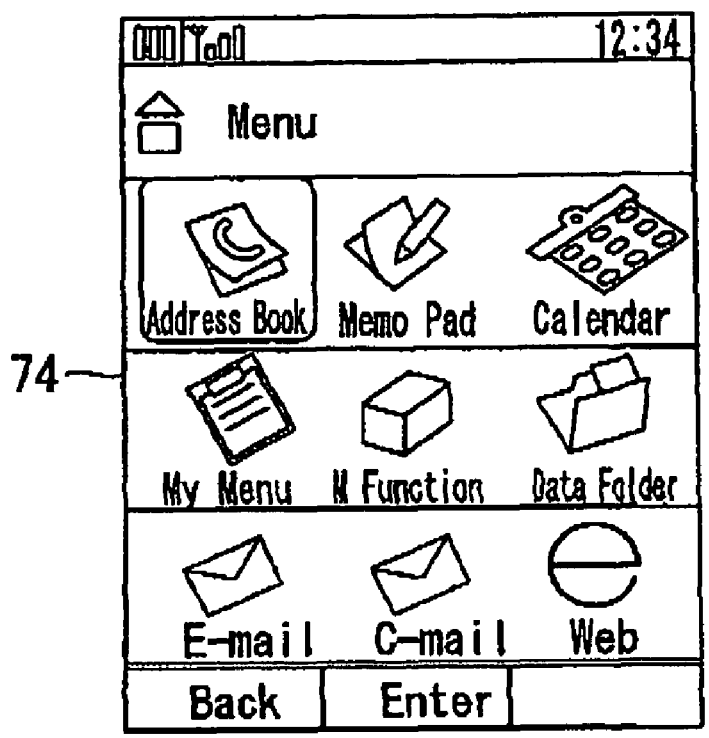
FIG. 9 is a view showing a selection screen 74 displayed on the display unit 12 in FIG. 1.

Next, FIGS. 7 through 9 show images displayed on the display surface 12.

FIG. 7 shows a wait screen 70 that is displayed when the portable telephone 30 is not operated for a predetermined length of time or the like.

FIG. 8 shows a first selection screen 72 when the first housing 32 and the second housing 34 are in a superimposed state (i.e., a closed state). When the first housing 32 and second housing 34 are in a superimposed state, operation can be performed using the side key 42 and the 3-directional lever 44. Therefore, to correspond to this, each function is arranged in a vertical direction as a character string item (i.e., is arranged one-dimensionally) on the first selection screen 72.

Note that, in the drawings, the e-mail item is shown in a reversed display. This is to notify the user that the item highlighted like this in a reversed display is the selected item. The user confirms that the item the user wishes to input is shown in reverse display and enters that item by pressing the 3-directional lever 44 inwards (i.e., in the direction indicated by the arrow e in FIG. 5) at the center position.

FIG. 9 shows a second selection screen 74 when the first housing 32 and the second housing 34 are in an opened up state (i.e., an open state). When the first housing 32 and second housing 34 are in an open state the cursor key 18 of the main input unit 16 can be used. Therefore, to correspond to this, each function is displayed using icons arranged two-dimensionally in vertical and horizontal directions on the second selection screen 74.

Note that, in the drawings, the address book icon is enclosed by a frame. This is to notify the user that the item encircled by a frame is the selected item.

In this manner, because the first selection screen 72 and the second selection screen 74 display the respective functions of the portable telephone 30 as items, a user is able to select a specific function from among these items. When a user selects a specific function from among these items, even more detailed items of that specified function can be displayed by the same methods as used for the first selection screen 72 and the second selection screen 74. Therefore, in the present invention, the term selection screen refers to a menu screen that displays each function as an item and a screen that displays items belonging to each function; that is, to a screen that allows a selection to be made using an input unit.

Next, the operation of the superimposed type of portable telephone 30 will be described based on the flow charts shown in FIGS. 10 and 11.

When the first housing 32 and the second housing 34 of the superimposed type of portable telephone 30 are in a closed state and there has been no input for a predetermined length of time, the wait screen 70 shown in FIG. 7 is displayed on the display surface 12 (step S1). If there is no input at all by a user in this state (i.e., the determination is No in step S2), the wait screen 70 continues to be displayed without change on the display surface 12 (step S1).

If the user presses the 3-directional lever 44 of the second housing 34 at the center position in order to make an input (i.e., the determination is Yes in step S2), the first selection screen 72 shown in FIG. 8 is displayed on the display surface 12 (step S3). When a user has selected and entered a desired item from the first selection screen 72 (i.e., the determination is Yes in step S4), the screen changes to the operations screens of each function corresponding to selected item (step S5).

Figure 11:
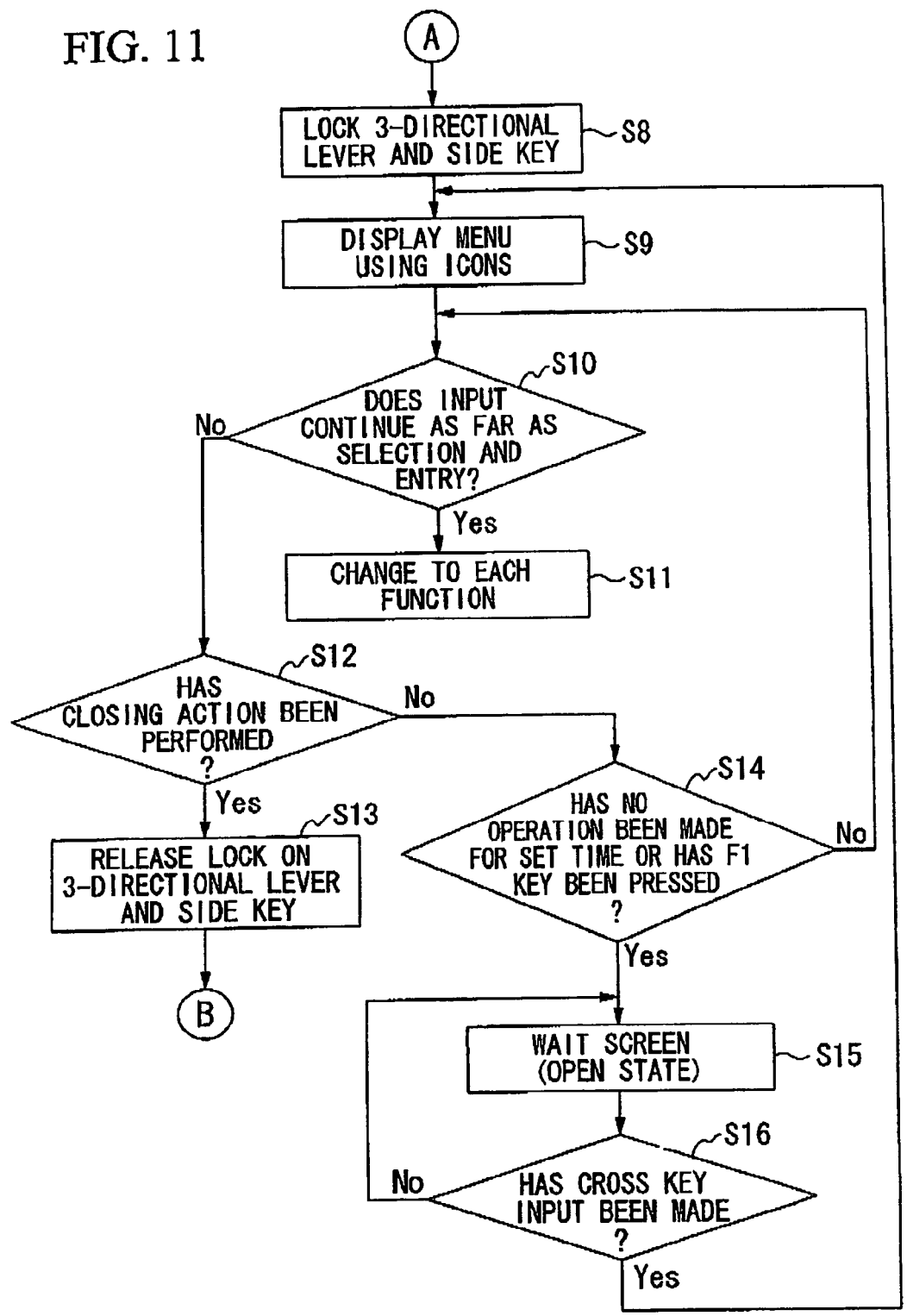
FIG. 11 is a flow chart showing an operation of the superimposed type of portable telephone shown in FIG. 1.
Figure 12:
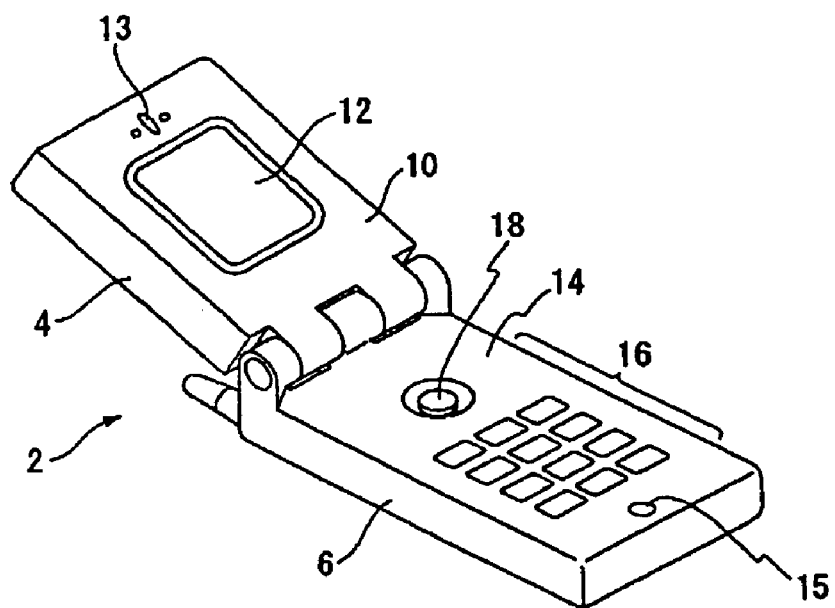
FIG. 12 is a perspective view showing a conventional folding type of portable telephone.

In step S4, if the user opens up the first housing 32 from the second housing 34 (i.e., the determination is Yes for the opening action in step S6) without selecting a specific item from the first selection screen 72, or, if a specific item has been selected, without performing an operation to enter the selected item (i.e., the determination is No in step S4), the routine moves to step S8 in FIG. 11.

If, however, in step S6 the determination as to whether the opening action to open the first housing 32 has been performed is No, then if there is no further input for a predetermined length of time, or if the side key 42 of the first housing 32 has been pressed (i.e., the determination is yes in step 57), then the wait screen 70 is once again displayed on the display surface 12 (step S1). If, however, in step S7 the 3-directional lever 44 is operated within a predetermined length of time (i.e., No), a state in which the first selection screen 72 shown in FIG. 8 is displayed on the display surface 12 is maintained.

If the first housing 32 is opened up from the second housing 34 in step S6, because it is possible to use the cursor key 18 and the like of the main input unit 16, th~ side key 42 and the 3-directional lever 44 are locked so as to be made inoperative (step S8). This prevents any wrong input from being made. The second selection screen 74 shown in FIG. 9 displaying icons is then displayed on the display surface 12 (step S9).

When a user is able to select and enter a desired item from the second selection screen 74 using the cursor key 18, and actually has selected and entered such an item (i.e., 15 the determination is yes in step S10), the screen changes to the operation of each function corresponding to that item (Step S11).

At this time, because the second selection screen 74 is displaying the items as icons the user is able to understand intuitively the function of each item. In addition, because these icons are arranged both vertically and horizontally in two dimensions, a large number of items can be displayed at the same time on the display surface 12.

Moreover, because the main input unit 16 and, particularly, the cursor key 18, which allows up-down and left-right operation to be made, can be used in the open state in which the second selection screen 74 is displayed, a desired icon (i.e., item) can be easily selected from the icons arranged vertically and horizontally in two dimensions and then entered.

Figure 10:
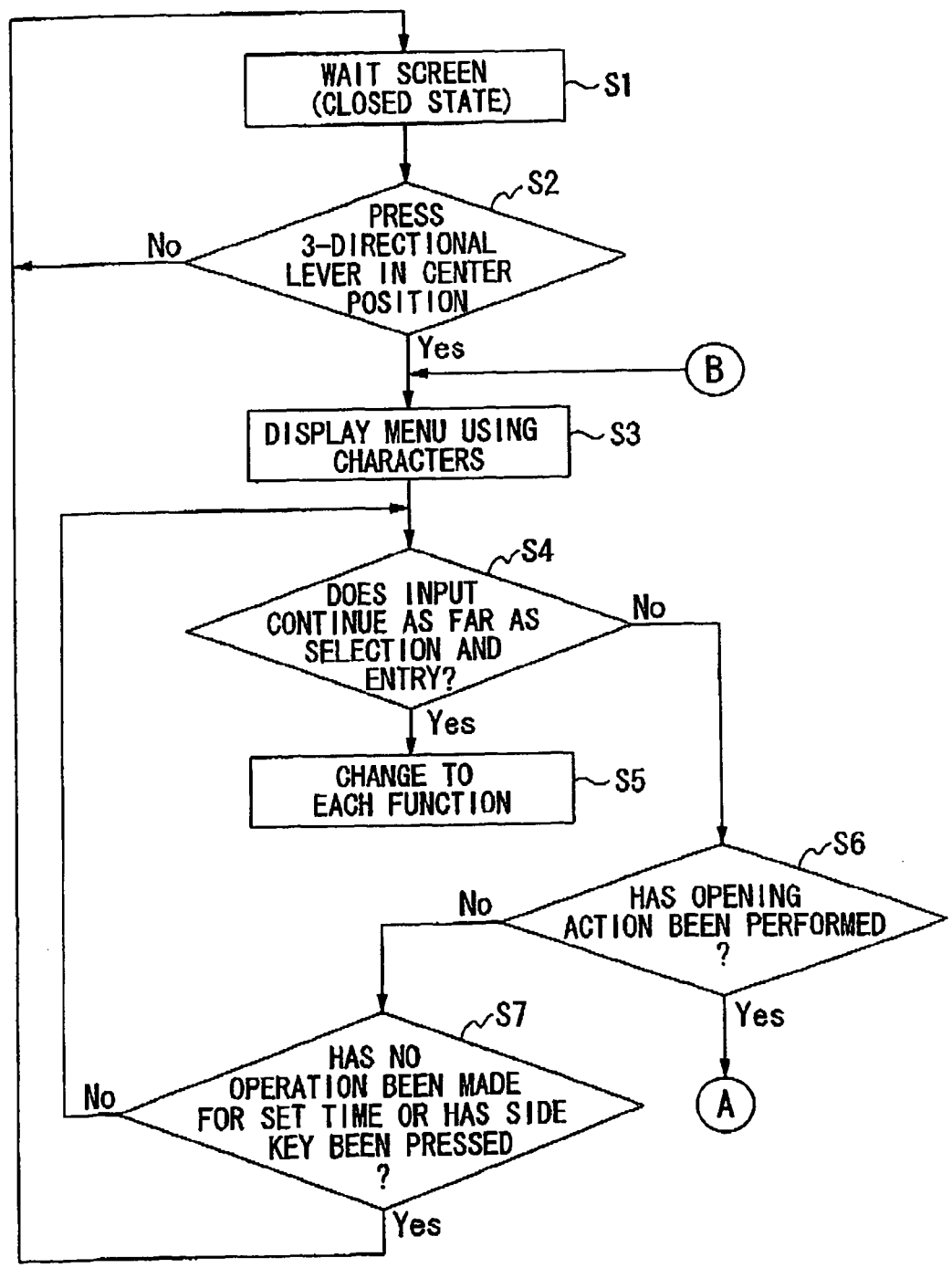
FIG. 10 is a flow chart showing an operation of the superimposed type of portable telephone shown in FIG. 1.

If the first housing 32 and the second housing 34 are superimposed (i.e., the determination is Yes for the closing action in step S12) without the user selecting a specific item from the second selection screen 74, or, if a specific item has been selected, without the user performing an operation to enter the selected item (i.e., the determination is No in step S10), the lock making the side key 42 and the 3-directional lever 44 inoperative is released and the routine moves to step S3 in FIG. 10.

If, a specific key, for example, the F1 (function 1) key of the main input unit 16 is pressed (i.e., the determination is Yes in step S14), or if no input is made for a predetermined length of time without the user having selected a specific item from the second selection screen 74, or, if a specific item has been selected, without the user performing an operation to enter the selected item (i.e., the determination is No in step S10), or if the closing action to superimpose the first housing 32 and the second housing 34 has not been performed (i.e., the determination is No in step S12), then the wait screen 70 shown in FIG. 7 is displayed on the display surface 12 (step S15).

Here, because the wait screen 70 displayed in step S15 remains in an open state due to the closing action not having been performed, the top and bottom directions are displayed in reverse compared to the wait screen 70 in the closed state in step S1.

If the cross key 18 of the main input unit 16 is operated in the state in step S15 in which the wait screen 70 is displayed on the display surface 12 (i.e., the determination is Yes in step S16), then once again the second icon-based selection screen 74 shown in FIG. 9 is displayed on the display surface 12 (step S9).

In step S4 in FIG. 10, if the first housing 32 is opened up from the second housing 34 (i.e., the determination is Yes in step S6) without the user performing an operation to enter a selected item after having selected that specific item from the first selection screen 72 shown in FIG. 8, then it is also possible for an item corresponding to the specific item selected in step S4 to be selected in the second icon-based selection screen 74 shown in FIG. 9.

Furthermore, in the superimposed type of portable telephone 30 shown in FIGS. 1 through 4, an example is shown in which auxiliary input units are positioned on the respective side surfaces 38 and 40 of the first housing 32 and the second housing 34. However, in addition to this, it is also possible to position the auxiliary input units on surfaces other than those of the first housing 32 and the second housing 34 that face each other in a closed state, such as the end surfaces adjacent to the surface of the first housing 32 where the display unit 11 is located and to the surface of the second housing 34 where the main input unit 16 is located.

However, in view of the operability using one hand when the two housings are in a closed state, it is preferable that the auxiliary input units be provided on a side surface adjacent to the surface of the first housing 32 on which the display unit 11 is located and/or a side surface adjacent to the surface of the second housing 34 on which the main input unit 16 is located.

A description is given above of an embodiment of the superimposed type of portable telephone of the present invention, however, it is to be understood that the present invention may also be applied based on the same technological idea even when the superimposed type of portable terminal is formed by three or more housings.

Furthermore, in the above described embodiment a description is given of a portable telephone, however, the present invention may also be applied in the same way to other types of portable terminal apparatuses such as PDA and the like.

What is claimed is:

1. A portable terminal comprising:
   a first housing having at least a display unit;
   a second housing having at least a main input unit, and connected openably and closably to said first housing; and
   an auxiliary input unit arranged on a surface other than mutually facing surfaces of both of said housings in a closed state;
   wherein said display unit is visible to a user in a closed state and an opened state,
   a screen on said display unit is able to display a first selection screen which displays items and allows a selection to be made using said auxiliary input unit, and which is appropriate for an operation by said auxiliary input unit when both of said housings are in said closed state, and
   a screen on said display unit is able to display a second selection screen which is different from said first selection screen, and which is appropriate for an operation by said main input unit when both of said housings are in said opened state, and
   the portable terminal further comprising:
   a state detecting device which detects opening and closing of both said housings; and
   a control device which switches a display screen on said display unit; wherein said control device switches between said first selection screen and said second selection screen in accordance with a state detected by said state detecting device.

2. A portable terminal according to claim 1, wherein said first selection screen arranges said items one-dimensionally, and said second selection screen arranges items multi-dimensionally.

3. A portable terminal according to claim 2, wherein said main input unit includes a key capable of being operated in a direction of an arrangement of said items on said second screen, and said auxiliary input unit includes a lever capable of being operated in a direction of an arrangement of said items on said first selection screen.

4. A portable terminal according to claim 1, wherein said items of said first selection screen are characters, and items of said second selection screen are icons.

5. A portable terminal according to claim 1, wherein said items on said first selection screen are characters while items on said second selection screen are icons, and when a selection screen has been switched in accordance with an opening action or a closing action from a state in which an item on said first or second selection screen has been selected, said item remains selected in a form of a character or an icon corresponding to said first or second screen.

6. A portable terminal according to claim 1, wherein said main input unit includes a key capable of being two-dimensionally operated, and said auxiliary input unit includes a lever capable of being one-dimensionally operated.

7. A portable terminal according to claim 1, wherein the portable terminal is a personal digital assistant.

8. A portable terminal according to claim 1, wherein the portable terminal is a portable telephone.

9. A portable terminal according to claim 1, wherein, when said housings are in said opened state, said control device locks said auxiliary input unit so that operations of said auxiliary input unit are invalid.

10. A portable terminal according to claim 1, wherein said second selection screen displays at least one of said items and allows a selection to be made using said main input unit.

11. A portable terminal comprising:
    a first housing having at least a display unit;
    a second housing having at least a main input unit, and connected openably and closably to said first housing; and
    an auxiliary input unit arranged on a surface other than mutually facing surfaces of both of said housings in a closed state;
    wherein said display unit is visible to a user in a closed state and an opened state,
    a screen on said display unit is able to display a first selection screen arranging items one-dimensionally when both of said housings are in a closed state, and
    a screen on said display unit is able to display a second selection screen arranging items multi-dimensionally when both of said housings are in a opened state, and
    the portable terminal further comprises:
    a state detecting device which detects opening and closing of both said housings;
    a control device which switches a display screen on said display unit;
    wherein said control device switches between said first selection screen and said second selection screen in accordance with a state detected by said state detecting device.

12. A portable terminal according to claim 11, wherein said main input unit includes a key capable of being two-dimensionally operated, and said auxiliary input unit includes a lever capable of being one-dimensionally operated, items on said first selection screen can be selected by said lever operation, and items on said second selection screen can be selected by said key operation.

13. A portable terminal according to claim 11, wherein the portable terminal is a personal digital assistant.

14. A portable terminal according to claim 11, wherein the portable terminal is a portable telephone.

* * * * *